Nov. 6, 1928.  1,690,809
T. V. BARNARD ET AL
POWER DRIVEN CORN HARVESTER
Filed Sept. 28, 1925   4 Sheets-Sheet 1
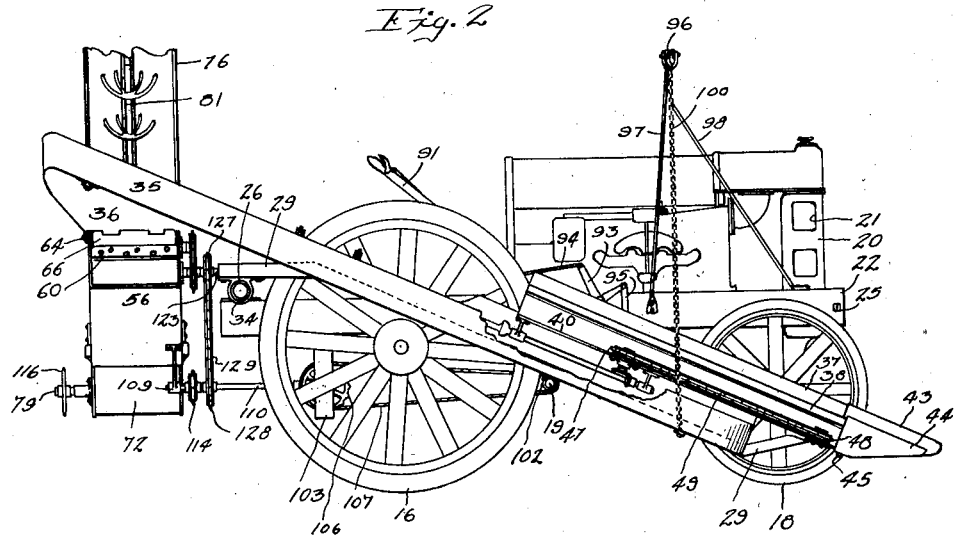
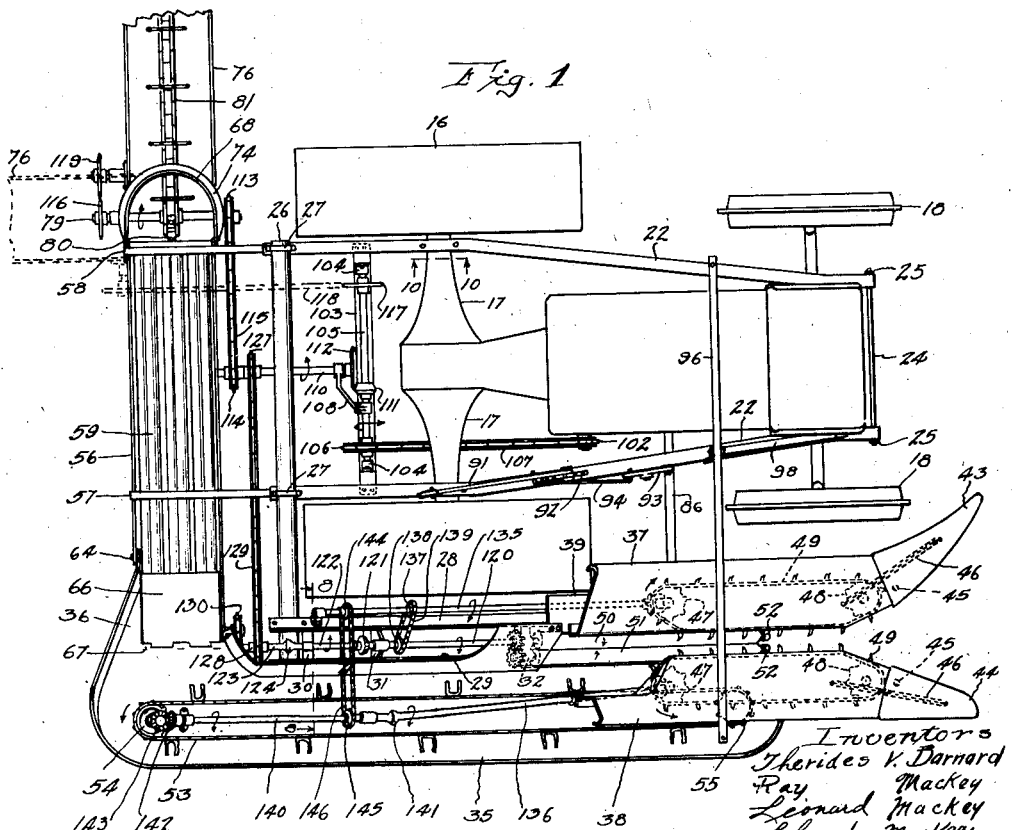

Nov. 6, 1928. 1,690,809
T. V. BARNARD ET AL
POWER DRIVEN CORN HARVESTER
Filed Sept. 28, 1925 4 Sheets-Sheet 2
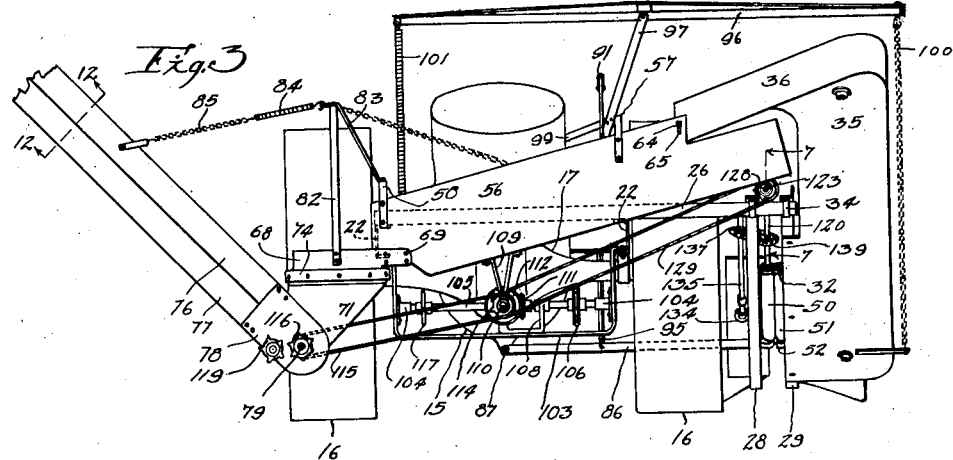
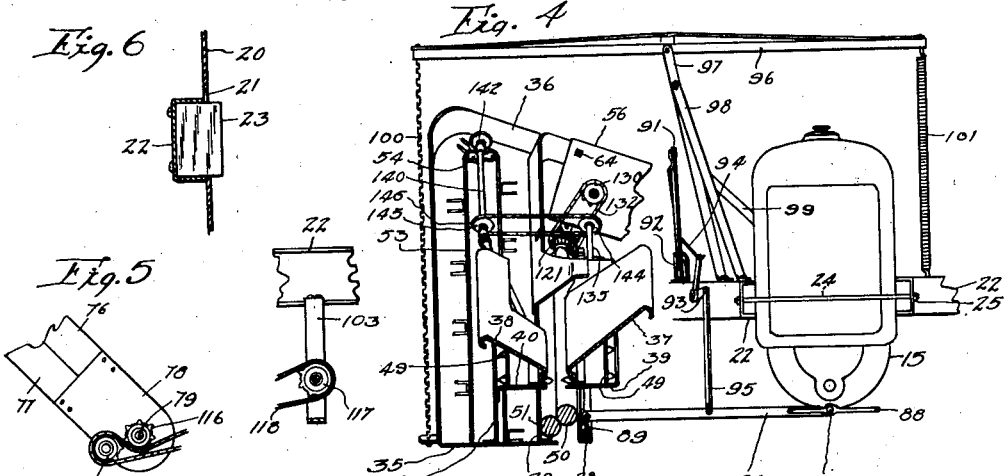
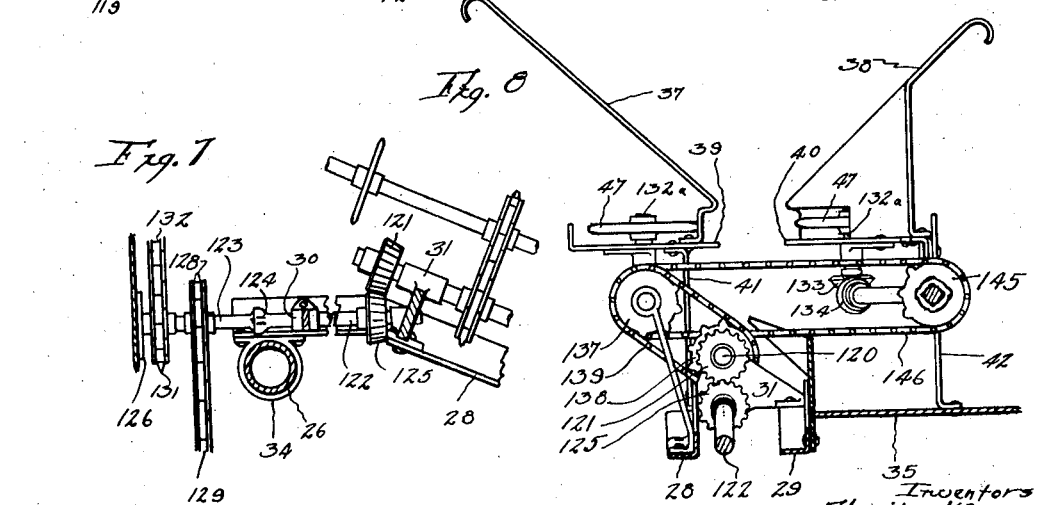

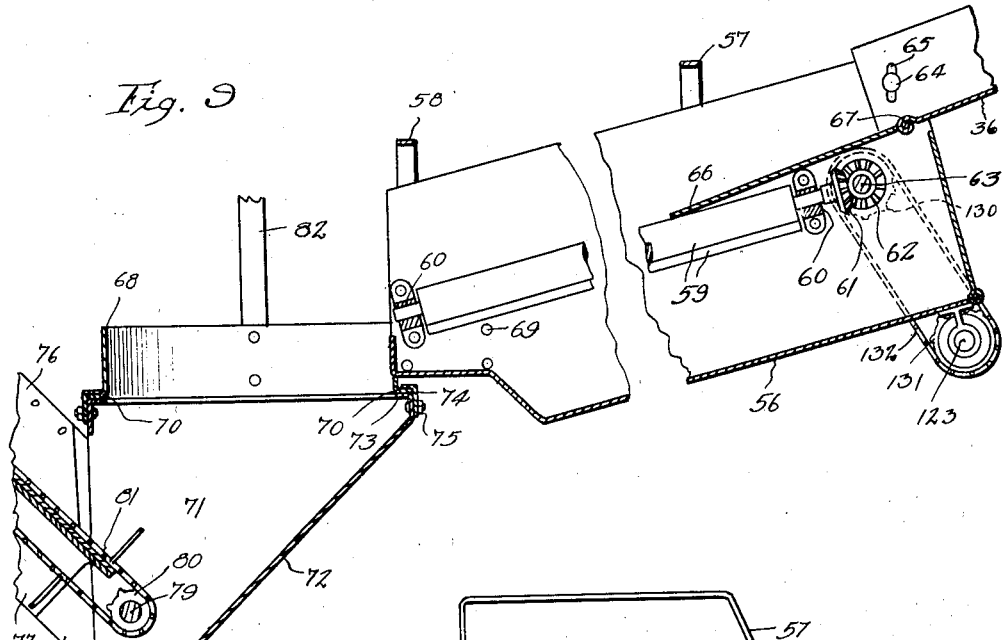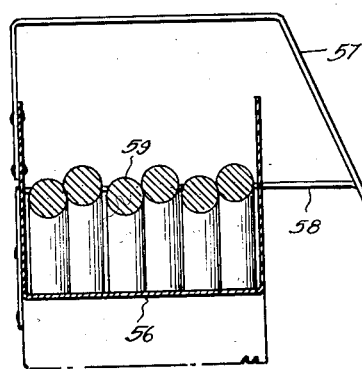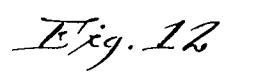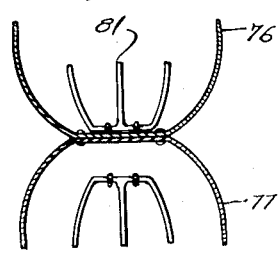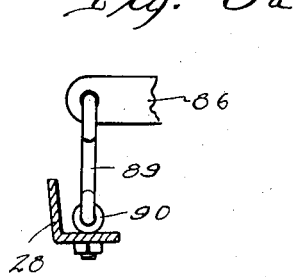

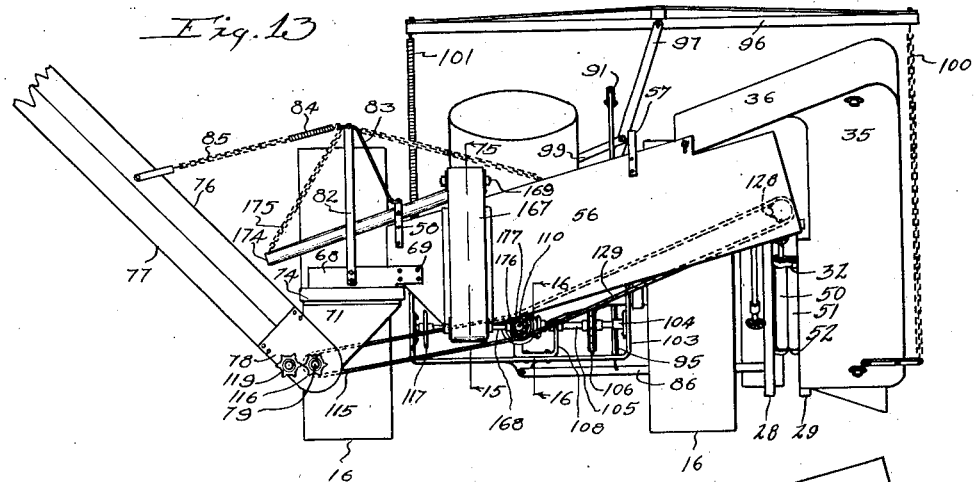
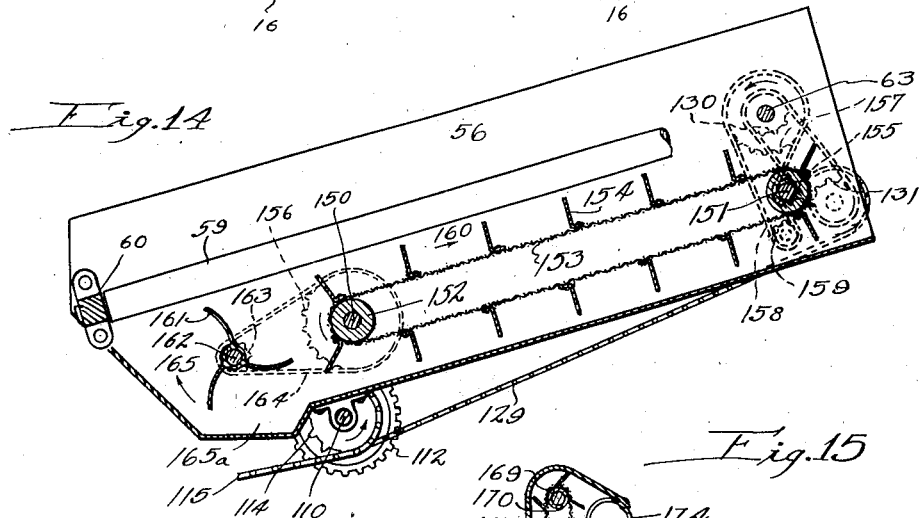
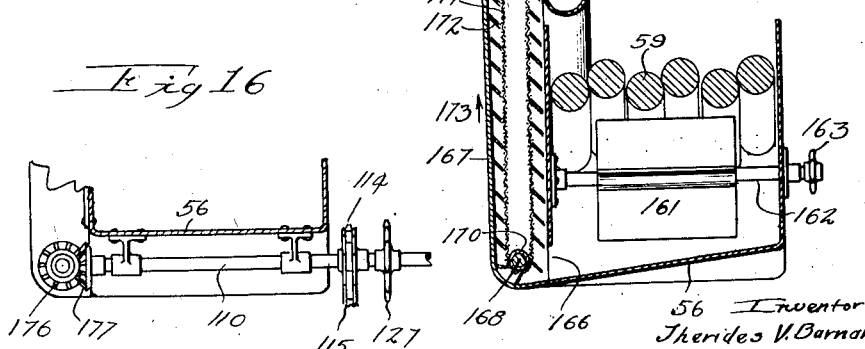

Patented Nov. 6, 1928.

1,690,809

UNITED STATES PATENT OFFICE.

THERIDES V. BARNARD, OF SCHALLER, IOWA, AND RAY MACKEY, LEONARD MACKEY, AND LELAND MACKEY, OF IPSWICH, SOUTH DAKOTA.

POWER-DRIVEN CORN HARVESTER.

Application filed September 28, 1925. Serial No. 59,075.

Our invention relates to a corn harvesting attachment adapted to be readily and speedily attached to a tractor of common make, to form therewith a power driven harvesting machine which is adapted to first pick the ears of corn from a standing row, and to then husk the ears and elevate them to a wagon travelling beside the harvester.

Another object of our invention is to provide such a harvester which is designed to demand a minimum of power from the tractor which furnishes its motive power, the arrangement of the parts being such as to minimize side draft and to give the proper speed of rotation to the revolving picker rolls and husking mechanism such that the tractor may be driven in its intermediate speed without crowding the aforesaid picking and husking mechanism.

A further object of this invention is to provide such a harvester in which the harvesting mechanism is balanced relative to the attached tractor, the dividing arms being located on the right side of the tractor, and the weight of the driving mechanism for the dividing arms being centered to the left of the central longitudinal axis thereof; and the elevating mechanism for the husked ears being located substantially opposite the center of gravity of the divider arms on the left side of the tractor, in line with the center thereof.

Our invention further contemplates the use of a novel means for raising and lowering the divider arm mechanism relative to the tractor, wherewith the said divider arms may be hinged at their rear ends at a position where it is most convenient to link the driving mechanism of the divider arms with the drive from the tractor. Thereby the use of flexible driving connections at this position allows vertical swinging of the divider arms independently of the connected husking mechanism, and without the necessity of moving the husking mechanism in unison therewith.

Another object is to provide such a raising and lowering means with which the weight of the divider arms is at all times approximately balanced, allowing the manipulation thereof with very little effort of the operator.

A still further object is to provide a novel elevator structure having an adjustability around a vertical axis.

With these and other objects in view, our invention consists in the construction, arrangement and combination of the various parts of our device, whereby the objects contemplated are attained, as hereinafter more fully set forth, pointed out in our claims and illustrated in the accompanying drawings, in which:

Fig. 1 is a plan view of the harvester embodying a common type of tractor, the elevator support being omitted in order to better illustrate the construction.

Fig. 2 is a right side elevation of the same.

Fig. 3 is a rear elevation of the same.

Fig. 4 is a fragmental view illustrating the tractor from the front, and the divider arms in vertical section, in order to show the raising mechanism for the divider arms.

Fig. 5 is a fragmental view illustrating an alternative drive connection to the elevator.

Fig. 6 is a detail sectional view taken through the forward end of the attachment frame sill, and a portion of the adjacent radiator shell of the tractor, illustrating the manner of attachment thereto.

Fig. 7 is a detail sectional view, taken as indicated by the line 7—7 of Fig. 3.

Fig. 8 is a detail sectional view, taken as illustrated by the line 8—8 of Fig. 1.

Fig. 8ª is a detail view of the connection between the lower raising lever and the divider arm frame.

Fig. 9 is a detail longitudinal sectional view, taken through portions of the elevator and husking mechanism.

Fig. 10 is a detail sectional view, taken as indicated by the line 10—10 of Fig. 1.

Fig. 11 is a detail sectional view, taken transversely through the husking mechanism, illustrating the mounting thereof and the method of securing the divider arms rock shaft to the frame sills.

Fig. 12 is a detail sectional view, taken as indicated by the line 12—12 of Fig. 3.

Fig. 13 is a rear view of the machine showing the grain saving elevator.

Fig. 14 is a sectional view taken longitudinally through the husking mechanism, illustrating the husk discharging mechanism.

Fig. 15 is a sectional view taken on the line 15—15 of Fig. 13, and

Fig. 16 is a sectional view taken on the line 16—16 of Fig. 13.

In Figs. 1 to 4 inclusive I have shown portions of the ordinary Fordson tractor, having the engine housing 15, the rear traction wheels 16, the rear axle housing 17, the front wheels 18, the belt pulley shaft 19, and the radiator shell 20, which is provided in its sides with squared openings 21.

The harvesting attachment has a frame consisting of a pair of side rails 22 of channel iron. The two channels are positioned facing each other, and at their forward ends are provided with blocks 23 of wood or the like, which are secured between the side flanges of the channels and project therebeyond.

When the attachment is in place on the tractor, the blocks 23 extend into the lower openings 21 of the radiator shell, and thus serve to support the rails 22 relative to the tractor. The rails are secured in position against the side of the shell 20 by means of a tie rod, 24, which connects the extending ends of the rails in front of the radiator.

A threaded nut 25 at one end of the tie rod allows removal of the rod and subsequent removal of the rails by slipping the blocks 23 from the openings 21.

The rails are connected together at their rear ends by means of a tubular rock shaft 26, which extends beyond the rail on the right side of the machine, as shown in Figs. 1 and 3, in order to support the divider arm mechanism. Yokes 27 serve to secure the rock shaft to the rails, as shown in Fig. 11.

The rails 22 are supported upon the tractor axle housing 17 through the medium of pillow blocks 22$^a$, and are secured in place thereon by means of U-bolts 22$^b$. (See Fig. 10.)

The divider arm structure has a frame comprising the two angle iron ribs 28 and 29, which are rigidly connected by means of bearing brackets 30, 31 and 32. The ribs 28 and 29 are journalled upon the extended end of the rock shaft 26 by means of the bearing sleeves 34. (See Fig. 7.) The ribs extend horizontally forwardly and thence are inclined forwardly and downwardly, as indicated in dotted lines in Fig. 2.

An elevating chute 35 is secured to the under side of the rib 29 and extends upwardly and rearwardly beyond the end thereof, terminating in a discharge portion 36, inclined to the left.

The divider arms and divider arm chain shelves 37, 38, 39 and 40, respectively, are secured to vertical walls or the like 41 and 42, respectively, which are in turn secured to the rib 28 and trough 35, respectively. (See Fig. 8.)

The chain shelves 39 and 40 are supported at their forward ends by the forward ends of the ribs 28 and 29, as shown in Fig. 2.

The shoes 43 and 44, respectively, are pivoted to the forward ends of the shelves 39 and 40, as indicated at 45, and are adjustably secured against downward movement by the chains 46.

Sprockets 47 and 48, mounted on the shelves 38 and 39 and spaced rearwardly and forwardly thereof respectively, carry the feed chains 49, which are indicated in dotted lines in Fig. 1.

Snapping rolls 50 and 51, respectively, are journalled in the bracket 32 and in brackets 52 carried by the ribs 28 and 29.

A conveyor chain 53 travels on sprockets 54 and 55, mounted in the elevator trough 35.

Referring now to Figs. 9 and 11, we provide a husking unit having a frame member 56 which is suspended from the rear ends of the side rails 22 by means of the arched brackets 57 and 58. (See also Fig. 1.)

Husking rolls 59 are journalled in brackets 60 and 61 mounted in the frame 56, and at their ends are geared in the ordinary fashion by means of bevel gears 61 to the bevel gears 62 on the transverse shaft 63.

The discharge end 36 of the chute 35 is connected to the frame 56 of the husking unit by means of bolts 64 extended through slotted openings 65 in the side walls of the respective members. The slotted connections allow some relative vertical movement of the parts, and it will thus be seen that as the divider arms are lifted, lowering the rear end of the elevator chute 35, the frame 56 may remain stationary without interfering with the said movement.

A discharge apron 66 is hinged at 67 to the edge of the bottom portion of the discharge member 36, and its free end rests upon the husking rolls 59, with which it will remain in contact irrespective of the relative positions of the elevator trough and husking roll frame.

The discharge elevator has a rotatable connection with its hopper which allows it to be moved to either of two positions, one in which it extends rearwardly, and the other in which it extends to the left of the tractor.

The hopper includes a U-shaped collar 68, the arms of which are secured at 69 to the sides of the husking roll frame. An annular flange 70 is turned outwardly on the lower edge of the collar 68.

The rotatable portion of the hopper comprises a pyramidal member having the parallel sides 71 and inclined side 72, opposite which an opening is provided to allow entrance of the elevating chain. The upper edge of the movable hopper member is flanged inwardly, as at 73, which flange is maintained in engagement with the flange 70 by means of a ring 74, which is L-shaped in cross-section, and removably secured to the movable hopper member by means of bolts, or the like, 75.

The elevator is formed of a pair of channels 76 and 77, secured together back to back by riveting or the like, and at their lower ends are provided with a pair of flat plates 78 which embrace the sides of the hopper and are swingingly secured thereto by means of a shaft 79. The shaft 79 is provided with a sprocket 80, over which, and over a sprocket at the upper end of the elevator, (not shown) there travels a conveyor chain 81.

A standard 82, secured to the collar 68, extends and is centered at its upper end thereabove. A brace 83, extending from the bracket 58, braces the upper end of the standard 82. A spring 84, secured at one end to the standard, is linked at its other end to the elevator through the medium of a chain 85.

The suspension just described maintains the elevator in correct angular position in a vertical plane, and yet allows it to swing horizontally.

The forward end of the divider arm structure is supported at the end of a lever 86, one end of which is pivoted upon the bolt 87, which secures the radius rod 88 of the tractor to the engine housing 15, and the other end of which is linked to the divider arm frame in such a manner as to allow for the variation in the distance between adjacent points of the lever 86, and the divider arm frame caused by these two members swinging in planes which are perpendicular to each other.

This is accomplished by means of a link 89, secured at one end in the lever 86, and at its other end, in the eye-bolt 90 secured to the frame rib 28. (See Figs. 4 and 13.)

A hand lever 91, coacting with a quadrant 92 on the frame rail 22, adjustably supports the lever 86 near its center, through the medium of a bell crank lever 93 and the links 94 and 95, which serve to change the direction of motion imparted by the lever from horizontal to vertical.

The majority of the weight of the divider arms is supported by means of a derrick lever 96, which is fulcrumed upon a bracket arm 97, secured at its lower end to the rail 22 on the right side of the tractor, and braced by the brace arms 98 and 99, secured to the rail 22 and to the engine block, respectively.

A chain 100 connects one end of the lever 96 to the divider arm structure, as shown in Figs. 3 and 4, and a heavy coil spring 101 is secured between the other end of the lever and the left frame rail 22.

It will now be seen that the weight of the divider arm structure will place the spring 101 under tension, such that a portion of the weight of the suspended parts will be carried by the spring. However, the strength of the spring is such that when the lever 91 is moved forwardly and the lever 86 consequently lowered, the pull of the spring will be overcome by the weight of the suspended parts, and the divider arms will consequently be lowered. When the lever is pulled rearwardly, the spring will assist in raising the divider arms.

As a result, the manipulation of the divider arms is extremely easy.

The parts are geared together by means of a drive arrangement which allows the tilting of the divider arms while the husking mechanism remains stationary. The drive is also so arranged that changes in the speed ratios between the various parts thereof may be effected if necessary or desirable, with an interchanging of a minimum number of parts.

A sprocket 102 replaces the ordinary belt pulley on the shaft 19. A U-shaped bracket 103 is secured at its ends to the rails 22 and suspended between the same. Bearings 104, secured to the bracket 103, support a shaft 105, on which is a sprocket 106, aligned with the sprocket 102. A chain 107 travels between the sprockets 102 and 106.

Mounted in brackets 108 and 109 secured to the bracket 103 and to the under side of the husker frame 56, respectively, is a shaft 110. A bevel gear 111 on the shaft 105 meshes with a bevel gear 112 on the shaft 110.

On one end of the shaft 79 of the husked ear elevator is a sprocket 113, which is aligned with a sprocket 114 on the shaft 110, and connected therewith by means of a chain 115, and on the other end of the shaft 79 a sprocket 116 is positioned to align with a sprocket 117 on the shaft 105 when the elevator is in the position indicated in dotted lines in Fig. 1. A chain 118 then connects the sprockets 116 and 117 through the medium of an idler 119 on the elevator, which gives the proper direction of rotation to the sprocket 116.

The shaft 120 of the left picker roll 50 extends rearwardly to the bearing 31, in which it is journalled, and carries at its end a bevel gear 121. A short shaft 122, which for convenience will be referred to as a counter shaft, is journalled in the bearings 30 and 31, and at its rear end is connected by means of a gimbal joint 124 to a second counter shaft 123. (See Fig. 7.) A bevel gear 125, in mesh with the bevel gear 121, transmits rotation from the shaft 122 to the shaft 120.

The shaft 123 is journalled at its rear end in a bearing 126, secured to the husker frame 56, and which will allow a little play of the shaft 123 vertically. It will be noted that the gimbal joint 124 is positioned directly over the shaft 26, and with the slight flexibility of the shaft 123, the movement of the shaft 122 relative thereto caused by the tilting of the divider arms (which movement is mainly longitudinal of the shafts) will be allowed without impairing the driving connection between the shafts.

Sprockets 127 and 128 on the shafts 110 and 123, respectively, are connected by a chain 129 to transmit rotation from the first to the second named shaft.

Sprockets 130 and 131 on the shafts 63 and 123, respectively, connected by a chain 132, transmit rotation between the respective shafts. In this connection, the shafts 63 and 23 might, by lowering the husker, be united, but such an arrangement would tend to interfere with the flexing of the shaft 123, as mentioned.

The shafts 132, upon which the gathering chain sprockets are mounted, extend through the shelves 39 and 40, and carry at their lower ends bevel gears 133, (see Figs. 1 and 8) which mesh with bevel gears 134 on the rearwardly extending shafts 135 and 136. The shaft 135 has a sprocket 137 aligned with a sprocket 138 on the shaft 120, and is driven from the latter shaft by means of a chain 139.

The shaft 136 extends rearwardly at a slight angle to a position where it is aligned with the sprocket 54, from whence a shaft 140, connected to the shaft 136 by means of a gimbal joint 141, extends rearwardly to the sprocket 34, and is geared thereto by means of the bevel gears 142 and 143.

A sprocket 144 on the shaft 135 is aligned with a sprocket 145 on the shaft 140, and serves to drive the latter shaft by means of a chain 146 travelling upon said sprockets. (See Fig. 1.)

It will be noted that the elevator 35 is positioned on the side of the divider arm structure which is remote from the tractor. As a result, the parts can be built much closer to the tractor than would be otherwise possible. The shoe 43 extends entirely across the path of the right front wheel 18, and thus prevents any of the stalks being run over thereby.

Should it be found necessary to change the ratio of the rotational speed of the snapping rolls to that of the husking rolls, the gear ratio may be so changed by simply substituting a sprocket of different size for the sprocket 130.

If it is desired to change the ratio of the entire picking and husking mechanism to that of the tractor the sprocket 106 may likewise be changed. When the farmer has completed using the harvester, the attachment may be disassociated from the tractor very readily by releasing the forward ends of the rails 22, as described, removing the U-bolts 22ᵇ and slipping the chain 107 from the sprocket 102. The entire attachment may then be lifted vertically by means of a suitable derrick or the like, and swung clear of the tractor.

The lever 86 retains the picker arms from excessive side swinging, and yet allows a little of such motion, which facilitates the following of the row. Such side flexibility is the result of hinging the picker structure at its rear extremity rather than near its intermediate region.

It is essential, owing to the nature of the picker structure, that the drives between the various moving parts be positioned as near the rear as possible, and by hinging the divider arms at the rear the coupling between the shiftable portions of the drive mechanism, and between the fixed portions thereof, may be accomplished by means of a single gimbal joint, which, owing to the extreme rear position of the rock shaft, 26, may be placed to the rear of the drives between the picker elements, and still be positioned closely adjacent the rock shaft as is necessary.

Under some conditions it will be advisable to use the harvester with the husked corn elevator in the position shown, while at other times the position shown in dotted lines will be preferable. For instance, when travelling on a side hill with the elevator uphill, the former position will be an advantage in balancing the divider arms, but when travelling on a side hill with the elevator downhill, or when travelling past an obstruction, the second position will be the most desirable.

The directions of rotation of the various parts are indicated by the arrows shown in Fig. 1.

In Figs. 13 to 16 inclusive, we have illustrated in detail the construction of the husking mechanism. Beneath the husking rollers 59, journalled in the side of the husking frame 56, are a pair of transverse shafts 150 and 151, which support rollers 152, over which travels a fabric belt, or the like, 153. Secured to the belt 153 are the transverse vanes or slats 154. The end of the shafts 150 and 151 next to the tractor extend through the wall 56, and are provided with sprockets 155 and 156, respectively, which are shown in dotted lines in Fig. 14. The shaft 63 is provided with a sprocket 157, which is aligned with the sprocket 155, and a chain 158 travels over the sprocket 157, an idler 159 and the sprocket 155. By the use of the idler 159 the shaft 151 is given a direction of rotation which will cause the belt 153 to travel as indicated by the arrow 160.

A blower fan 161 is carried by a shaft 162 journalled in the side 56. The shaft 162 extends through the side 56 at one end, and has a sprocket 163 aligned with the sprocket 156, and geared thereto by means of a chain 164. Thus the shaft 150 serves to transmit rotating motion to the blower 161, as indicated by the arrow 165.

The husks from the corn will fall from the belt 153 and will be carried by the slats 154 to the rear open end of the husking frame, whence they will be discharged. The blower 161 will create a current of air tending to clear the space below the husking rollers of all chaff, and the heavier grains of corn which pass between the rollers will slide toward the lower end of the frame until they are received in the pocket 165 formed therein.

From thence the grains of corn will slide laterally through an opening 166 into the grain saving elevator, which we will now describe.

A casing 167 is secured to the side of the husking frame 56, as illustrated in Fig. 13, and has a pair of shafts 168 and 169 journalled in its lower and upper ends respectively. Rollers 170 are carried by the shafts 168 and 169, and a belt 171 travels over the rollers.

Buckets, or the like, 172, scoop the grain which passes into the lower end of the elevator through the opening 166 and carry it upwardly, as indicated by the arrow 173 to the upper end of the casing, from whence it is delivered into a spout 174 secured to the casing, as illustrated in Fig. 15. The spout 174 may be swung on a chain 175, secured to the bracket 82, and has its lower end positioned above the ear elevator as shown. The loose kernels of corn will thus be discharged into the ear elevator and will be carried, together with the ears, into the receiving bin or wagon.

The shaft 168 has on one end a bevel gear 176 which meshes with a bevel gear 177 carried on the end of the shaft 110, from which rotation is imparted to the elevator.

Some changes may be made in the construction and arrangement of the various parts of our invention without departing from the real spirit and purpose of our invention, and it is our intention to cover by our claims any modified forms of structure or the use of mechanical equivalents which may reasonably be included within their scope.

We claim as our invention:

1. In a corn harvesting attachment for a tractor having rear traction wheels, a rear axle housing, and a radiator shell having side openings, a pair of side frame rails secured together at their rear ends and adapted to be extended over and secured, intermediate their ends, to the tractor rear axle housing, inwardly extending blocks carried by the forward ends of the rails, adapted to be received in said openings, a means to secure the forward portions of the rails in positions gripping the sides of the radiator shell, with the said blocks extending into the openings therein, and picking and husking mechanism supported from the rear portions of the rails.

2. In a corn harvesting attachment for a tractor having rear traction wheels, a rear axle housing, and a radiator shell having side openings, a pair of side frame rails adapted to be secured, intermediate their ends, to the rear axle housing, inwardly extending blocks extended over and secured to the rails near their forward ends, to be received in said openings, means extending across, forwardly of the radiator shell, between the rails, to tie the rails together in positions gripping the sides of the radiator shell with the blocks received in the openings therein, and picking and husking mechanism supported from the rear portions of said rails.

3. In a corn harvesting attachment for a tractor having rear traction wheels, a rear axle housing, and a radiator shell having side openings, a pair of rails secured together at their rear ends by means of a rock shaft extending behind a rear traction wheel, the intermediate portions of the rails being extended over and secured to the rear axle housing, blocks secured to the rails near their forward ends and loosely received in said openings, means to tie the rails together at their forward ends in positions gripping the sides of the radiator shell, and picking mechanism hinged at its rear end upon said rock shaft.

4. In a corn harvester attachment for a tractor having rear traction wheels and a rear axle housing, a frame secured to said rear axle housing and to the forward portion of the tractor, a rock shaft carried by said frame having a portion extending behind and beyond a rear traction wheel, picking mechanism hinged near its rear end upon said rock shaft, and means to adjustably support the forward portion of the said picker mechanism from the tractor in any of several vertical positions.

5. In a corn harvester attachment for a tractor having rear traction wheels and a rear axle housing, a frame secured to the rear axle housing and to the forward portion of the tractor, a rock shaft carried by said frame having a portion extending behind and beyond a rear traction wheel, picking mechanism hinged near its rear end upon said rock shaft, and means to support the forward portion of the picker mechanism.

6. In a corn harvesting attachment for a tractor having rear traction wheels, a rear axle housing and a belt pulley shaft extending from the side of the tractor, a frame secured to the axle housing and to the forward portion of the tractor, a transverse shaft carried by the frame, chain and sprocket gearing between said transverse shaft and the belt pulley shaft, husking mechanism supported from the frame and positioned rearwardly of the traction wheels and transversely of the tractor, an elevator mounted at the end of said husking mechanism for swinging adjustment around a vertical axis, a longitudinal shaft supported between the frame and the husking mechanism, gearing mechanism on said elevator for transmitting power to the same, and sprockets on the respective shafts, one of said sprockets being positioned to align with said gearing mechanism when the elevator is in one position and the other of said sprockets being positioned to align with the said gearing mechanism when the elevator is in a position at right angles to said first mentioned position.

7. In a corn harvester, a husking mechanism frame, a flanged collar secured to the end of said frame, an elevator hopper rotatably mounted upon the flange of said collar in position to receive material discharged from the husking mechanism, and an elevator carried by said hopper and having a suspending connection with the said frame.

8. In a corn harvester, a frame including a rear transverse rock shaft, picking mechanism having a frame hinged near its rear end upon said rock shaft, said picking mechanism including an elevator extending rearwardly of said rock shaft, a husking mechanism positioned fixedly relative to the frame, having an end positioned under the discharge end of said elevator, and arranged to allow said discharge end to swing vertically, and means for transmitting power to the picking mechanism, including a first counter shaft journalled in the picking mechanism frame and a second counter shaft journalled relative to the husking mechanism and a gimbal joint connecting said counter shafts near said rock shaft.

9. A harvester attachment for a tractor comprising a pair of rails secured to the tractor between the rear wheels thereof and extending rearwardly beyond the said wheels, a rock shaft secured to the rails and having a portion extending behind one of said wheels, picking mechanism hinged at its rear extremity upon said extended portion of the rock shaft and positioned beside the tractor, the forward extremity of the picking mechanism being supported from said rails for vertical adjustment, husking mechanism extending transversely behind the wheels of the tractor and supported from the rear ends of said rails, and an ear elevator supported at the end of the husking mechanism opposite the picking mechanism.

10. A harvester attachment for a tractor comprising a pair of rails secured to the tractor between the rear wheels thereof and extending rearwardly beyond the said wheels, a rock shaft secured to the rails and having a portion extending behind one of said wheels, picking mechanism hinged at its rear extremity upon said extended portion of the rock shaft and positioned beside the tractor, husking mechanism extending transversely behind the wheels of the tractor and supported from the rear ends of said rails, and an ear elevator supported at the end of the husking mechanism opposite the picking mechanism.

Signed at Schaller, in the county of Sac and State of Iowa, this 14 day of September, 1925.

THERIDES V. BARNARD.

Signed at Ipswich, in the county of Edmunds and State of South Dakota, this 21 day of September, 1925.

LEONARD MACKEY.
LELAND MACKEY.
RAY MACKEY.